Patented Feb. 27, 1951

2,542,972

UNITED STATES PATENT OFFICE 2,542,972

STABILIZATION OF ORGANIC COMPOUNDS

Ralph B. Thompson, Riverside, Ill., assignor to Universal Oil Products Company, Chicago, Ill., a corporation of Delaware No Drawing. Application March 27, 1947, Serial No. 737,715

15 Claims. (Cl. 44—78)

1

This invention relates to the stabilization of organic compounds which tend to deteriorate in storage or in use due to oxidation reactions.

Various organic compounds including motor fuel, mineral oil, lubricating oil, drying oil, greases, rubber, etc., as well as various edible fats and oils, are adversely affected by oxygen, with the resultant formation of undesirable gum, discoloration, rancidity or other deleterious reactions. The invention is particularly applicable to the treatment of motor fuels comprising olefinic gasolines, such as cracked gasoline and polymer gasoline.

One object of the invention is to prevent or at least substantially retard the undesirable deterioration of organic compounds.

Another object of the invention is to provide a novel class of inhibitors which will function to stabilize organic compounds.

Still another object of the invention is to provide a novel method of preparing these inhibitors.

Still another object of the invention is to provide novel compositions of matter.

In one embodiment the present invention relates to a method of stabilizing an organic material subject to oxidative deterioration which comprises adding thereto an inhibitor comprising a bis-(3,4-dihydroxy-phenyl)-alkane.

In a specific embodiment the present invention relates to a method of stabilizing cracked gasoline which comprises incorporating there in from about 0.0001% to about 0.1% by weight of 2,2-bis-(3,4-dihydroxyphenyl)-propane.

In another specific embodiment the present invention relates to a method of preparing a bis-(3,4-dihydroxyphenyl)-alkane which comprises reacting a bis-(4-hydroxyphenyl)-alkane with a middle halogen to form bis-(3-halo-4-hydroxyphenyl)-alkane, and reacting said bis-(3-halo-4-hydroxyphenyl)-alkane with an alkaline hydroxide to form said bis-(3,4-dihydroxyphenyl)-alkane.

In still another specific embodiment the present invention relates to a method of preparing a bis-(3,4-dihydroxyphenyl)-alkane which comprises condensing a carbonyl compound with phenol to form a bis-(4-hydroxyphenyl)-alkane, reacting the last mentioned compound with a middle halogen to form bis-(3-halo-4-hydroxyphenyl)-alkane, and reacting the last mentioned compound with an alkaline hydroxide to form said bis-(3,4-dihydroxyphenyl)-alkane.

In still another specific embodiment the present invention relates to novel compositions of matter comprising bis-(3-halo-4-hydroxyphenyl)-alkanes.

The novel inhibitor of the present invention may be illustrated by the following general formula

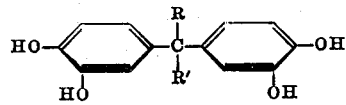

in which R and R' may be hydrogen, alkyl, aryl, alkaryl, or aralkyl.

In the first step of preparing the novel inhibitor of the present invention, phenol is condensed with a carbonyl compound comprising a ketone or an aldehyde. Suitable ketones include acetone, diethyl ketone, dipropyl ketone, dibutyl ketone, diamyl ketone, methylethyl ketone, methylpropyl ketone, methylbutyl ketone, methyamyl ketone, ethylpropyl ketone, ethylbutyl ketone, ethylamyl ketone, propylbutyl ketone, etc. Suitable aldehydes include formaldehyde, acetaldehyde, propionaldehyde, butyraldehyde, valeraldehyde, etc. The condensation of 2 mols of phenol and 1 mol of ketone or aldehyde is readily effected at room temperature in the presence of an acid catalyst, such as hydrochloric acid, sulfuric acid, etc. Usually an excess of ketone is used compared to phenol, although the reaction involves only 1 mol of acetone per 2 mols of phenol. The desired bis-(4-hydroxyphenyl)-alkane is readily recovered by the usual methods.

It will be noted that a bis-(4-hydroxyphenyl)-alkane is readily prepared by the condensation of a ketone or aldehyde with phenol. On the other hand the preparation of a bis-(3,4-dihydroxyphenyl)-alkane cannot be made by the condensation of catechol with a ketone or aldehyde. When catechol is condensed with acetone, for example, the product is 5,6,5',6',-tetrahydroxy-3,-3,3',3'-tetramethyl-bis-1,1'-spirohydrindene. It is thus seen that 2,2-bis-(3,4-dihydroxyphenyl)-propane cannot be prepared by the condensation of catechol and acetone, but that it is readily prepared by the novel process of the present invention.

In the next step of the process, bis-(4-hydroxyphenyl)-alkane is reacted with a middle halogen, comprising bromine or chlorine, to form bis-(3-halo-4-hydroxyphenyl)-alkane. This reaction is readily effected by dissolving bis-(4-hydroxyphenyl)-alkane in a suitable solvent, such as chloroform and/or ether, and then gradually adding bromine or chlorine, preferably in a suitable solvent, such as chloroform, with constant stirring and cooling. After the reaction has proceeded to the desired extent, the product may be washed with water to remove the hydrogen halide and then the solvent may be evaporated. The desired product may be recovered by crystallization from alcohol or other suitable medium.

The bis-(3-halo-4-hydroxyphenyl)-alkanes may be illustrated by the following general formula

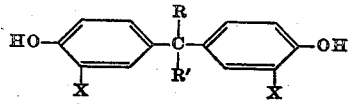

in which X is bromine or chlorine and in which R and R' may be hydrogen, alkyl, aryl, alkaryl or aralkyl. These compounds are believed to be new compositions of matter.

In the next step of the process, the bis-(3-halo-4-hydroxyphenyl)-alkane is reacted with a suitable alkaline hydroxide, comprising alkali metal hydroxides and alkaline earth metal hydroxides and preferably sodium hydroxide, potassium hydroxide, calcium hydroxide, strontium hydroxide, barium hydroxide, etc. This reaction may readily be accomplished by refluxing the bis-(3-halo-4-hydroxyphenyl)-alkane with an aqueous solution of the alkaline hydroxide, preferably in the presence of a catalyst comprising copper or cuprous oxide. It has been found that the alkaline solution readily oxidizes in the presence of air to form a highly colored product and it is therefore essential to employ means to exclude the presence of air. This may readily be accomplished by bubbling nitrogen or other inert gas through the alkaline hydroxide solution in order to free it of dissolved oxygen and also by effecting the refluxing in an inert atmosphere.

After the reaction has proceeded to the desired extent, the product is cooled and then acidified with hydrochloric acid, sulfuric acid, etc., after which the product may be extracted with any suitable solvent, such as ether, leaving the alkaline halide formed in the reaction in the aqueous phase. The product may then be washed with water to remove any impurities and the final product may be reconcentrated in any suitable manner.

The inhibitor of the present invention will usually be employed in an amount of less than 0.5% by weight and generally will be used in an amount of from about 0.0001% to about 0.1% by weight. The exact amount of inhibitor required will depend upon the particular organic compound being treated and upon the stability desired. These inhibitors may also be employed in conjunction with various dyes, antiknock agents such as tetraethyl lead, metal deactivators, synergists or other additives employed for specific purposes.

The following examples are introduced to illustrate further the novelty and utility of the present invention but not with the intention of unduly limiting the same.

2,2-bis-(3,4-dihydroxyphenyl)-propane was prepared as follows: 2,2-bis-(4-hydroxyphenyl)-propane (38.2 g.) was dissolved in chloroform (150 cc.) and ether (200 cc.). To this was added bromine (53 g.) in chloroform (50 cc.) dropwise with stirring and cooling. The mixture was washed with water to remove hydrogen bromide and the solvent evaporated. The product comprises 2,2-bis-(3-brom-4-hydroxyphenyl)-propane and, after crystallization from ether-petroleum ether, melted at 76–78° C.

A solution of sodium hydroxide (23 g. in 400 cc. of water) was freed of dissolved oxygen by bubbling nitrogen through it for one hour. To this solution was added the 2,2-bis-(3-brom-4-hydroxyphenyl) propane (19.5 g.), prepared in the above manner, and cuprous oxide (5 g.). This solution was boiled under refluxing conditions in an inert atmosphere for 4 hours. After cooling the material was acidified, extracted with ether, and the ether evaporated. The residue was extracted twice with hot water to remove any possible catechol present and was then reconcentrated. The final product was a light brown viscous oil.

*Example 1*

The above compound was tested in Pennsylvania cracked gasoline which had a blank induction period of 100 minutes. 0.015% by weight of the compound prepared in the above manner was added to the cracked gasoline and increased the induction period thereof from 100 minutes to 420 minutes. The induction period is determined by the oxygen bomb stability test which is a standard method for evaluating the storage stability of gasoline.

*Example 2*

0.075% by weight of the compound prepared in the above manner was added to another sample of the Pennsylvania cracked gasoline and increased the induction period thereof from 100 minutes to 1560 minutes.

*Example 3*

The compound prepared in the above manner was utilized to stabilize lard. The lard had a normal stability period of 1¼ hours as determined by the "Swift" test. This test is described in detail in the article by A. E. King, H. L. Roschen and W. H. Irwin which appeared in the Oil and Soap, vol. X, No. 6, pages 105 to 109 (1933). In general this test comprises bubbling air through a sample of the lard until rancidity is determined organoleptically and by peroxide values.

0.005% by weight of this inhibitor increased the number of hours until the lard developed a peroxide number of 20 from 1¼ to 10.

*Example 4*

The compound prepared in the above manner was also tested in another lard which had a normal stability period of 4½ hours. 0.02% by weight of this inhibitor increased the stability hours of the lard from 4½ to 75.

I claim as my invention:

1. A method of stabilizing an organic material subject to oxidative deterioration which comprises adding thereto an inhibitor comprising a bis-(3,4-dihydroxyphenyl)-alkane.

2. A method of stabilizing gasoline subject to oxidative deterioration which comprises adding thereto an inhibitor comprising a 2,2-bis-(3,4-dihydroxyphenyl)-propane.

3. A method of stabilizing cracked gasoline against deterioration by oxygen which comprises adding therefrom about 0.0001% to about 0.1% by weight of 2,2-bis-(3,4-dihydroxyphenyl)-propane.

4. An organic compound tending to deteriorate due to oxygen containing a bis-(3,4-dihydroxyphenyl)-alkane in an amount sufficient to retard said deterioration.

5. Cracked gasoline containing from about 0.0001% to about 0.1% by weight of a bis-(3,4-dihydroxyphenyl)-alkane.

6. Cracked gasoline containing from about 0.0001% to about 0.1% by weight of 2,2-bis-(3,4-dihydroxyphenyl)-propane.

7. Gasoline containing an inhibitor for oxidative deterioration comprising a bis-(3,4-dihydroxyphenyl)-alkane.

8. Gasoline containing an inhibitor for oxidative deterioration comprising 2,2-bis-(3,4-dihydroxyphenyl)-propane.

9. A method of stabilizing an organic material subject to oxidative deterioration which comprises adding thereto an inhibitor comprising a bis-(3,4-dihydroxyphenyl)-propane.

10. An organic compound tending to deteriorate due to oxygen containing a bis-(3,4-dihydroxyphenyl)-propane in an amount sufficient to retard said deterioration.

11. A method of stabilizing an organic material subject to oxidative deterioration which comprises adding thereto an inhibitor comprising a bis-(3,4-dihydrovyphenyl)-alkane in which the phenyl groups are attached to the same carbon atom.

12. An organic compound tending to deteriorate due to oxygen containing a bis-(3,4-dihydroxyphenyl)-alkane in an amount sufficient to retard said deterioration, the phenyl groups of said alkane being attached to the same carbon atom.

13. Lard containing an inhibitor for oxidative deterioration comprising a bis-(3,4-dihydroxyphenyl)-alkane.

14. Lard containing an inhibitor for oxidative deterioration comprising 2,2-bis-(3,4-dihydroxyphenyl)-propane.

15. Lard containing an inhibitor for oxidative deterioration comprising a bis-(3,4-dihydroxyphenyl)- alkane in which the phenyl groups are attached to the same carbon atom.

RALPH B. THOMPSON.

REFERENCES CITED

The following references are of record in the file of this patent:

UNITED STATES PATENTS

| Number | Name | Date |
| --- | --- | --- |
| 2,017,827 | Bannister | Oct. 15, 1935 |
| 2,199,021 | Bartram | Apr. 30, 1940 |
| 2,354,013 | Gump | July 18, 1944 |
| 2,359,242 | Perkins et al. | Sept. 26, 1944 |
| 2,400,033 | Tallman | May 7, 1946 |